(12) United States Patent  
Conen

(10) Patent No.: US 6,739,263 B1  
(45) Date of Patent: May 25, 2004

(54) PRINTING PROCESS FOR ABSORBENT SUBSTRATE

(75) Inventor: Allan Conen, Kogarah (AU)

(73) Assignee: Investment Marketing Consortium Pty Ltd. (AU)

(*) Notice: Subject to any disclaimer, the term of this patent is extended or adjusted under 35 U.S.C. 154(b) by 0 days.

(21) Appl. No.: 10/362,606

(22) PCT Filed: Aug. 21, 2001

(86) PCT No.: PCT/AU01/01034

§ 371 (c)(1),  
(2), (4) Date: Jul. 17, 2003

(87) PCT Pub. No.: WO02/16142

PCT Pub. Date: Feb. 28, 2002

(30) Foreign Application Priority Data

Aug. 21, 2000 (AU) .............................................. PR0042

(51) Int. Cl.⁷ ................................................. B41F 1/16
(52) U.S. Cl. ............................. 101/492; 8/436; 8/471; 8/922; 428/207
(58) Field of Search ................................ 101/482, 492, 101/33, 34; 8/436, 497, 467, 471, 637.1, 922; 442/414, 327; 428/206, 336, 337, 207; 156/289; 118/264

(56) References Cited

U.S. PATENT DOCUMENTS

| | | | | |
|---|---|---|---|---|
| 3,616,175 A | * | 10/1971 | Jung | 442/414 |
| 4,411,667 A | * | 10/1983 | Meredith et al. | 8/471 |
| 4,640,858 A | * | 2/1987 | Barnett | 428/90 |
| 4,728,564 A | * | 3/1988 | Akagi et al. | 428/336 |
| 4,892,556 A | * | 1/1990 | Schulzen et al. | 8/436 |
| 4,941,886 A | * | 7/1990 | Poletto | 8/497 |
| 4,980,224 A | * | 12/1990 | Hare | 156/289 |
| 5,641,563 A | * | 6/1997 | Truong et al. | 442/327 |
| 5,885,349 A | * | 3/1999 | Giallourakis | 118/264 |
| 6,090,749 A | * | 7/2000 | Kowalski | 347/105 |
| 6,383,614 B1 | * | 5/2002 | Carson | 428/206 |

FOREIGN PATENT DOCUMENTS

| | | |
|---|---|---|
| GB | 2206363 | 1/1989 |
| JP | 04100983 | 4/1992 |
| JP | 06192967 | 12/1992 |
| JP | 07189140 | 7/1995 |
| JP | 2000063479 | 2/2000 |

OTHER PUBLICATIONS

Derwent Abstract Accession No. 2000–251544/22, JP 200063479 A (Ukima Gosei KK) Feb. 29, 2000.  
Derwent Abstract Accession No. 92–178064/22, JP 04100983 A (Kanto Leather KK) Apr. 2, 1992.  
Derwent Abstract Accession No. 95–291078/38, JP 07189140 A (Ricoh KK) Jul. 25, 1995.  
Derwent Abstract Accession No. 94–261030/32, JP 06192967 A (Achilles Corp KK).  
International Search Report.

* cited by examiner

Primary Examiner—Eugene H. Eickholt  
(74) Attorney, Agent, or Firm—Ostrolenk, Faber, Gerb & Soffen, LLP

(57) ABSTRACT

An artificial chamois leather type product is provided with a colour printed decoration on at least one face thereof, that face having material such as polyester chamois material (12) and the cover layer (10, 11), typically of a latex material is highly moisture permeable yet provides wear resistance to the product; the cover material is characterized by being devoid of colouring material which would deleteriously affect a colour printed image (13) printed onto the layer.

9 Claims, 1 Drawing Sheet

PRINTING PROCESS FOR ABSORBENT SUBSTRATE

FIELD OF THE INVENTION

The present invention relates to colour printed materials having a liquid absorbent substrate colour printed with a selected design and more particularly is concerned with colour printed products generally known as synthetic chamois cloths. The invention also extends to synthetic chamois cloths or other similar products adapted in a novel way for use with colour printed designs thereon and to methods of production.

BACKGROUND OF THE INVENTION

For the purpose of cleaning windows, automobiles and the like, for many years, an artificial chamois leather has been available on the market, the product having a highly absorbent core and typically having coatings on each side which are highly moisture pervious and provide structural strength to the product. Artificial absorbent cloths are also useful for many other applications where cleaning and liquid absorbency is desired. Typically, a synthetic chamois leather has a core of polyester which is spongy and highly moisture absorbent with coatings of suitable materials which are sometimes described as latex. Most commonly, the whole product is tan coloured to simulate the appearance of natural leather with the advantage that this colour is useful for many applications because it does not show dirt.

There has for long been a need to provide a chamois type product on which decorative material can be displayed and the decorative material needs to be highly resistant to degradation during normal usage. Despite a longstanding need, the applicants are not aware of any previous successful processes for colour printing of artificial chamois cloths or similar products. There is a need to provide a system and product whereby clarity of printing and faithfulness of colour, particularly with full colour images, is achieved.

SUMMARY OF THE INVENTION

In one main aspect, the present invention provides a flexible absorbent product having a moisture absorbent synthetic core and a moisture permeable surface layer bonded to the core and wherein there is a coloured image applied to and permeating the surface layer and the surface layer is devoid of colouring which would be deleterious to the image quality.

Preferably, the core is an artificial chamois leather of synthetic material such as a polyester and has a relatively high proportion by weight of polyester whereby the coloured image also permeates into and is bonded to the core, thereby providing a durable product with image stability despite a period of usage which may include washing the product.

Preferably, the core is of polyester material formed into an absorbent artificial chamois with at least 40% by weight polyester.

Preferably, the surface layer is of latex or latex like synthetic material and provides a smooth white covering and into which the coloured image permeates.

For most applications, the invention will be implemented where the core is in the form of a layer having both its major surfaces bonded to the surface layer.

The invention is especially valuable when sublimation printing is utilised for applying the coloured image, especially where a four colour system is used. The present inventors have realised this is especially beneficial in permitting, by virtue of the preferred white covering material, a faithful colour reproduction with good clarity and permanency of image permitting complex full colour designs to be applied to the surface of the product, yet retaining the desired absorbency characteristics for cleaning and decoration purposes.

In another main aspect, the invention consists in a method of producing a decorated absorbent product comprising taking a substrate having a synthetic moisture absorbent core and a surface layer bonded thereto which is highly moisture permeable and provides a wear resistant surface layer and which is devoid of colouring material which would be deleterious to a coloured image, and applying a coloured image so as to permeate the surface layer without deleterious affect on the fluid transmission qualities.

Preferably, the method comprises using known sublimation printing inks which are transferred under heat and pressure from a transfer paper on which is disposed an image which has been digitally scanned from an original with appropriate inclusion of colour correction factors to suit the properties of colour dot take up of the surface layer of the product.

Embodiments of the invention lend themselves to many applications such as sports towels and artificial chamois leathers for window and automotive use as well as absorbent cloths for bar counters and as bath mats and numerous other applications. The capacity to reproduce images with a high degree of faithfulness in colour and clarity has not been achieved to the best of the applicant's knowledge with any prior art processes and particularly in preferred embodiments which adopt sublimation printing, it is now possible to meet a wide range of needs. For example, a golf towel could be produced with a detailed map of the course together with information and promotional materials and advertising. The towel will be durable, a good cleaning aid and capable of being washed, rung out and used for an extended period.

DESCRIPTION OF THE DRAWINGS

For illustrative purposes only, reference will now be made to the accompanying drawings which comprise:

In FIG. 1 the component layers are not to scale and in practice the upper layer 10 and the lower layer 11 would be very thin compared with the relatively thick core layer 12. The core layer 12 will be an artificial chamois material which is moisture absorbent and is of a polyester material having fibres and a bonding material. In the preferred embodiment a high proportion of the core is polyester and in practice at least 40% polyester is required by weight to produce good performance.

The upper and lower layers 10 and 11 are bonded layers typically of synthetic material of the class known as latex which has the function of providing a durable and wear resistant smooth layer to the core. In this embodiment the upper and lower layers 10 and 11 are white so as to provide an effective substrate for sublimation printing.

A transfer paper 13 is provided having on its lower surface as illustrated an image being a full colour image printed with sublimation inks. The manufacturing process includes applying the transfer sheet 13 to the top of the upper layer 10 and then applying heat and pressure to cause the image to be transferred to the upper layer 10. The upper layer 10 being of synthetic resin is permeated by the sublimation inks which migrate preferably also into the core.

Figure 1:
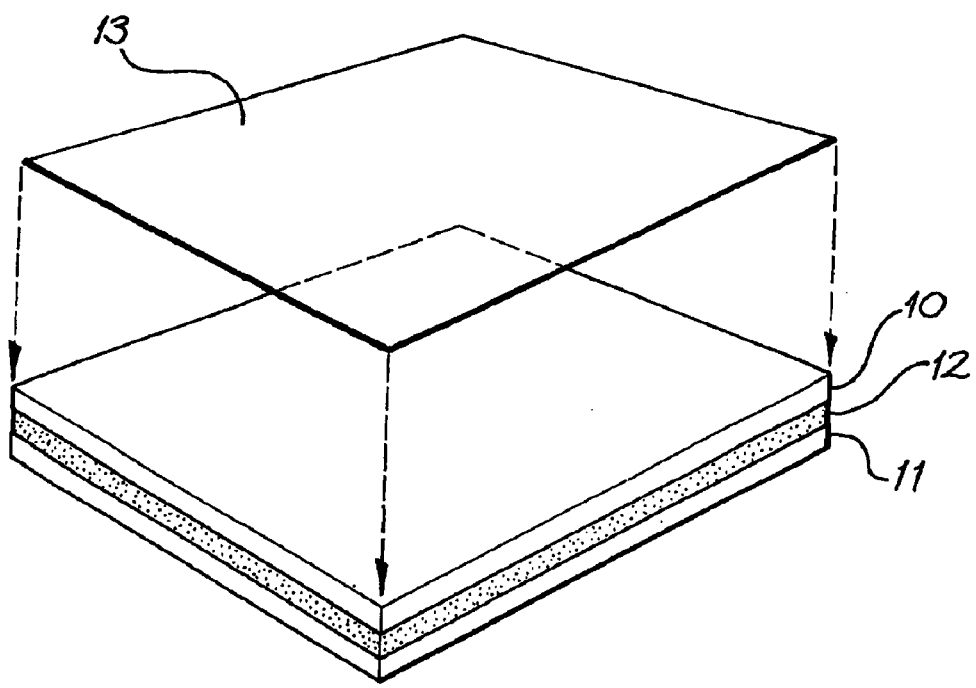
FIG. 1 is a schematic view of an embodiment of the invention ready for printing and FIG. 2 is a cross sectional view schematically showing the embodiment when printed.
Figure 2:
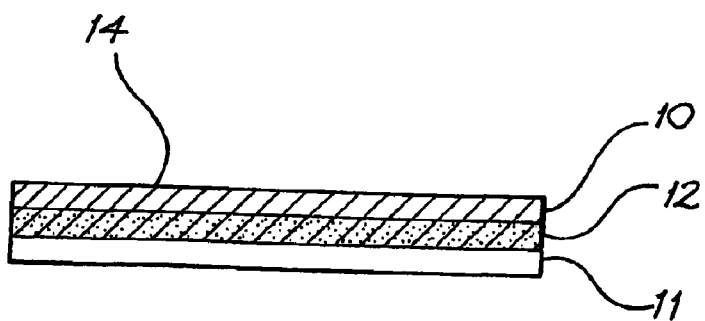

The final structure is schematically illustrated in FIG. 2 with the upper layer 10 having the full colour image 14 thereon and permeating the upper layer 10 and extending into the core 12. In this embodiment the lower layer 11 remains unprinted.

The claims defining the invention are as follows:

1. A flexible absorbent product having a moisture absorbent synthetic core and a moisture permeable surface layer bonded to the core and wherein there is a coloured image applied to and permeating the surface layer and the surface layer is devoid of colouring which would be deleterious to the image quality.

2. The flexible absorbent product of claim 1 wherein the core is an artificial chamois leather of synthetic material.

3. The flexible product of claim 2, wherein the synthetic material is a polyester and has a relatively high proportion by weight of polyester whereby the coloured image also permeates into and is bonded to the core.

4. The flexible absorbent product of claim 1 wherein the core is of polyester material formed into an absorbent artificial chamois with at least 40% by weight polyester.

5. The flexible absorbent product of claim 1 wherein the surface layer is of latex or latex like synthetic material and provides a smooth white covering and into which the coloured image permeates.

6. The flexible absorbent product of claim 1 wherein the core is in the form of a layer having both its major surfaces bonded to the surface layer.

7. The flexible absorbent product of claim 1 wherein sublimation printing is utilised for applying the coloured image.

8. A method of producing a decorated absorbent product comprising taking a substrate having a synthetic moisture absorbent core and a surface layer bonded thereto which is highly moisture permeable and provides a wear resistant surface layer and which is devoid of colouring material which would be deleterious to a coloured image, and applying a coloured image so as to permeate the surface layer without deleterious affect on the fluid transmission qualities.

9. The method of claim 8 wherein the method comprises using sublimation printing inks which are transferred under heat and pressure from a transfer paper on which is disposed an image which has been digitally scanned from an original with appropriate inclusion of colour correction factors to suit the properties of colour dot take up of the surface layer of the product.

* * * * *